US012639934B2

(12) United States Patent
Tsuruyama et al.

(10) Patent No.: US 12,639,934 B2
(45) Date of Patent: May 26, 2026

(54) ROBUSTNESS MEASUREMENT DEVICE, ROBUSTNESS MEASUREMENT METHOD, AND STORAGE MEDIUM

(71) Applicants: KABUSHIKI KAISHA TOSHIBA, Tokyo (JP); TOSHIBA DIGITAL SOLUTIONS CORPORATION, Kawasaki-shi (JP)

(72) Inventors: Tomoya Tsuruyama, Kawasaki Kanagawa (JP); Hidetaka Ohira, Tokyo (JP)

(73) Assignees: KABUSHIKI KAISHA TOSHIBA, Kawasaki (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 281 days.

(21) Appl. No.: 18/457,556

(22) Filed: Aug. 29, 2023

(65) Prior Publication Data

US 2024/0185585 A1     Jun. 6, 2024

(30) Foreign Application Priority Data

Dec. 2, 2022     (JP) ................................. 2022-193533

(51) Int. Cl.
*G06K 9/00*          (2022.01)
*G06V 10/764*       (2022.01)
*G06V 10/776*       (2022.01)
*G06V 20/70*         (2022.01)

(52) U.S. Cl.
CPC .......... *G06V 10/776* (2022.01); *G06V 10/764* (2022.01); *G06V 20/70* (2022.01)

(58) Field of Classification Search
None
See application file for complete search history.

(56) References Cited

U.S. PATENT DOCUMENTS

| | | |
|---|---|---|
| 2020/0279132 A1 | 9/2020 | Nogami et al. |
| 2021/0019399 A1 | 1/2021 | Miller et al. |
| 2021/0201526 A1* | 7/2021 | Moloney ................ G06N 3/084 |

FOREIGN PATENT DOCUMENTS

| | | | |
|---|---|---|---|
| JP | 2020-140518 A | 9/2020 | |
| WO | WO-2022076367 A1* | 4/2022 | ............... G06T 7/11 |

OTHER PUBLICATIONS

Ziyuan Zhong et al., "Understanding Local Robustness of Deep Neural Networks under Natural Variations," arXiv:2010.04821v2, 10 pages (2021).

* cited by examiner

*Primary Examiner* — Wei Wen Yang
(74) *Attorney, Agent, or Firm* — Finnegan, Henderson, Farabow, Garrett & Dunner, LLP

(57)          ABSTRACT

A robustness measurement device of an embodiment includes an acquirer, a noise adder, an inference result group generator, and a robustness measurer. The acquirer acquires an input image. The noise adder adds noise to the input image to generate at least one noise-added image by adding noise to the input image. The inference result group generator generates an inference result group by grouping mutually associated inference results among inference results for at least one of the input image or the noise-added image. The robustness measurer measures robustness of a test target model on the basis of the inference result group.

10 Claims, 8 Drawing Sheets

START OF ROBUSTNESS MEASUREMENT(SECOND METHOD)

MAKE COMPARISON WITH CORRECT ANSWER CLASS LABEL ～S211

CALCULATE CORRECT ANSWER RATIO ～S213

END

START OF ROBUSTNESS MEASUREMENT(THIRD METHOD)

CALCULATE VARIANCE VALUE OF BOUNDARY BOX ～S221

END

START OF ROBUSTNESS MEASUREMENT(FOURTH METHOD)

CALCULATE VARIANCE VALUE OF ESTIMATED CLASS LABEL ～S231

END

FIG. 9

|  | CASE 1 | CASE 2 | CASE 3 | CASE 4 |
|---|---|---|---|---|
| NOISE A | ○ | × | ○ | ○ |
| NOISE B | × | × | × | × |
| NON-NOISE | ○ | ○ | ○ | × |
| DETERMINATION RESULT | CORRECT DETECTION (TP) | NON-DETECTION (FN) | EXCESSIVE DETECTION (FP) | EXCESSIVE DETECTION (FP) |

FIG. 10

|  | CASE 5 | CASE 6 |
|---|---|---|
| NOISE A | ○ | × |
| NOISE B | × | × |
| NON-NOISE | ○ | ○ |
| DETERMINATION RESULT | PSEUDO CORRECT DETECTION (TP') | PSEUDO EXCESSIVE DETECTION (FP') |

ROBUSTNESS MEASUREMENT DEVICE, ROBUSTNESS MEASUREMENT METHOD, AND STORAGE MEDIUM

CROSS-REFERENCE TO RELATED APPLICATION

The present application claims priority based on Japanese Patent Application No. 2022-193533 filed Dec. 2, 2022, the content of which is incorporated herein by reference.

FIELD

Embodiments of the present invention relate to a robustness measurement device, a robustness measurement method, and a storage medium.

BACKGROUND

In the field of machine learning (artificial intelligence: AI) technology, a method of evaluating noise resistance of a test target model for a specific input image for class classification and regression problems has been proposed. In this method, a correct answer rate is calculated when any noise is added to the input image on the basis of correct answer data and the noise resistance of the test target model is evaluated.

Because the evaluation method in the related art requires the calculation of a correct answer rate, it is assumed that there is correct answer data (a correct answer label) serving as a training data at the time of inference (at the time of evaluation). For this reason, it is not possible to evaluate the noise resistance of a machine learning model when there is no correct answer data to be used as a training data at the time of inference. Also, the evaluation method in the related art does not cope with machine learning models for use in object detection.

BRIEF DESCRIPTION OF THE DRAWINGS

FIG. 9 is a diagram showing an example of (supervised) determination results of excessive detection and non-detection according to a third embodiment.

FIG. 10 is a diagram showing an example of (unsupervised) determination results of correct detection and excessive detection according to the third embodiment.

DETAILED DESCRIPTION

Hereinafter, a robustness measurement device, a robustness measurement method, and a storage medium of embodiments will be described with reference to the drawings.

A robustness measurement device of an embodiment includes an acquirer, a noise adder, an inference result group generator, and a robustness measurer. The acquirer acquires an input image. The noise adder adds noise to the input image to generate at least one noise-added image. The inference result group generator generates an inference result group by grouping mutually associated inference results among inference results for at least one of the input image or the noise-added image. The robustness measurer measures robustness of a test target model on the basis of the inference result group.

First Embodiment

A robustness measurement device of a first embodiment measures the robustness of a machine learning model against any noise. According to this robustness measurement device, it is possible to easily and highly accurately measure the robustness of a machine learning model regardless of the presence or absence of a training data (regardless of the presence or absence of correct answer data). Robustness refers to the property of being able to make an inference accurately with respect to various data. For example, robustness refers to the property of causing no deviation in inference results when an image to which various noise is added is input to the test target model.

In the following description, a case where the robustness measurement device is implemented by a single server device connected to the user's terminal device and the inference device via the network will be described as an example. However, the robustness measurement device may be implemented by a plurality of devices or may be implemented by being installed in the user's terminal device. Alternatively, the robustness measurement device may be implemented using cloud computing technology. The robustness measurement device and the inference device may be implemented by the same device.

[Device Configuration]

Figure 1:
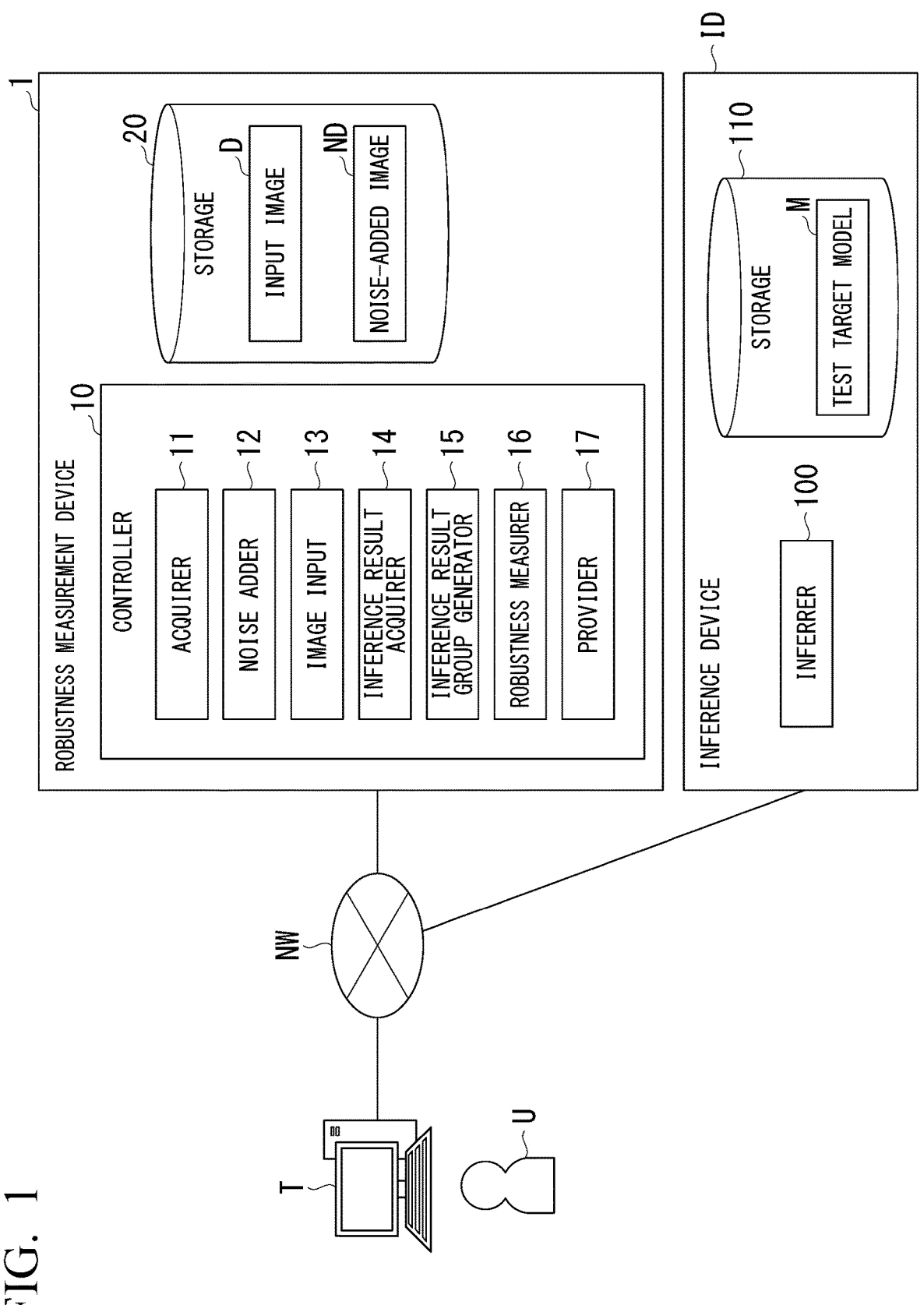
FIG. 1 is a functional block diagram showing an example of a functional configuration of a robustness measurement device 1 according to a first embodiment.

FIG. 1 is a functional block diagram showing an example of a functional configuration of a robustness measurement device 1 according to the first embodiment. The robustness measurement device 1 is communicatively connected to a terminal device T and an inference device ID via a communication network NW. The communication network NW includes, for example, the Internet, a wide area network (WAN), a local area network (LAN), a provider device, a radio base station, and the like.

The terminal device T is operated by, for example, a user U who tests a machine learning model serving as a test target (hereinafter referred to as a "test target model") or software that performs an inference process using the machine learning model. The terminal device T is, for example, a device such as a personal computer, a smartphone, or a tablet computer.

The inference device ID performs a prescribed inference process (for example, an object detection process) on an input image that has been input in response to a request from an external device (the robustness measurement device 1) and provides an inference result to a request source. The inference device ID may be implemented by, for example, software that operates according to a plug-in function. The inference device ID includes, for example, an inferrer 100 and a storage 110. The inferrer 100 inputs an input image input from the outside to a machine learning model and provides an inference result, which is the output of the machine learning model, to the request source. The storage 110 stores a machine learning model (a test target model M).

The test target model M is generated in various description methods such as a neural network, a support vector machine, and a decision tree. Neural networks include, for example, an autoencoder, a convolutional neural network (CNN), a recurrent neural network (RNN), and the like.

The robustness measurement device 1 includes, for example, a controller 10 and a storage 20. The controller 10 includes, for example, an acquirer 11, a noise adder 12, an image input 13, an inference result acquirer 14, an inference result group generator 15, a robustness measurer 16, and a provider 17. Functional units of the controller 10 are implemented, for example, by a computer such as a central processing unit (CPU) or a graphics processing unit (GPU) executing a program. Also, some or all of the functional units of the controller 10 may be implemented by hardware such as a large-scale integration (LSI) circuit, an application-specific integrated circuit (ASIC), or a field-programmable gate array (FPGA) or may be implemented by software and hardware in cooperation. The program may be stored in the storage 20 (a storage device including a non-transitory storage medium) in advance or may be stored in a removable storage medium (the non-transitory storage medium) such as a digital versatile disc (DVD) or a compact disc (CD)-read-only memory (ROM) and installed when the storage medium is mounted in a drive device.

The acquirer 11 acquires a robustness measurement request transmitted from the terminal device T via the network NW. The robustness measurement request includes information of the input image D for use in the test and the test target model M (the inference device ID). The acquirer 11 may acquire the input image D directly from the terminal device T or may acquire the input image D from another storage device (not shown) or a device such as a camera on the basis of the information included in the request. Also, when the input image D is stored in the storage 20 in advance, the acquirer 11 may acquire the input image D from the storage 20. The acquirer 11 is an example of an "acquirer."

The noise adder 12 generates at least one noise-added image ND to which noise is added by adding any noise to the input image D. The noise adder 12 adds noise to the input image D according to reproduction of weather noise such as rain or snow or the like as well as, for example, rotation, flipping, barrel/pincushion/shear distortion, Gaussian noise, color channel swapping, grayscale conversion, histogram equalization, and the like of the input image D. Thereby, it is possible to measure the robustness against noise assumed when the test target model M is actually used. For example, the noise adder 12 adds a plurality of different types of noise (for example, three types of noise, i.e., noise A, noise B, and noise C) to one input image D to generate a plurality of noise-added images ND (for example, three noise-added images ND). A plurality of different types of noise are, for example, noise with different noise levels. For each noise condition, noise obtained by combining the above-mentioned noise such as rotation is possible and a process of adding noise designated by the user U according to an actual operation environment, such as adding noise of rotation and snow and adding noise of flipping and rain is possible. The noise adder 12 is an example of a "noise adder."

The image input 13 calls the inferrer 100 of the inference device ID via the communication network NW and inputs at least one of the input image D or the noise-added image ND to the test target model M via the inferrer 100. Thereby, the inferrer 100 inputs at least one of the input image D or the noise-added image ND to the test target model M and acquires a prescribed inference result as the output of the test target model M. For example, inference results include detection results of objects included within the image. The object detection result is indicated by, for example, a prescribed rectangular boundary line (boundary box BB) surrounding the object and a class label indicating the classification of the object. Alternatively, a method of outputting estimated probability distributions for all classes to be detected instead of class labels, or a semantic segmentation method of estimating class labels for each pixel instead of rectangles may be used. The image input 13 is an example of an "image input."

Figure 2:
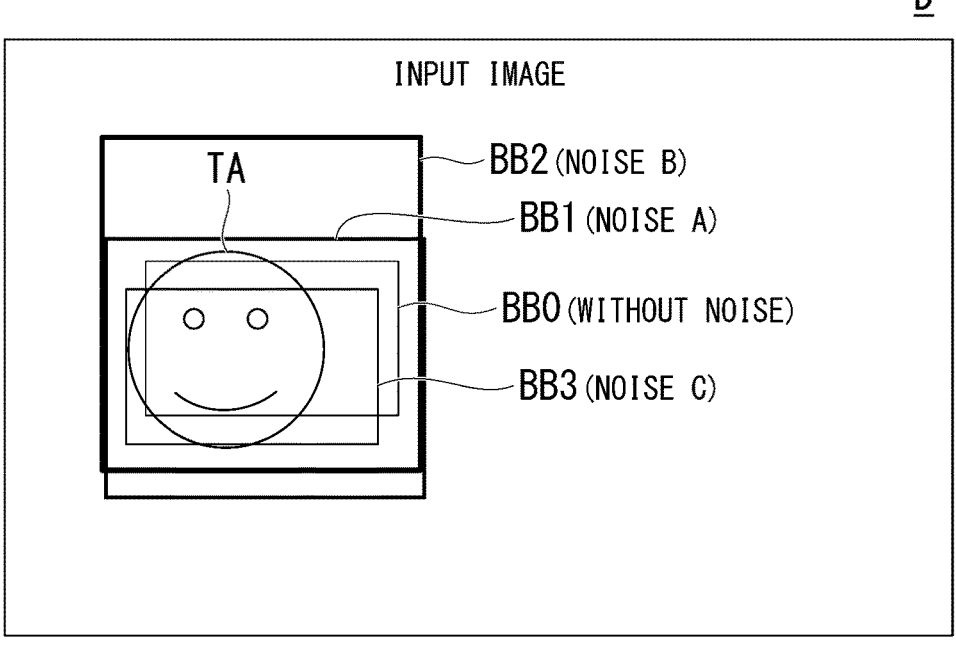
FIG. 2 is a diagram showing a state in which a boundary box BB is set for an image according to the first embodiment.

FIG. 2 is a diagram showing a state in which a boundary box BB is set for an image according to the first embodiment. In the example shown in FIG. 2, a boundary box BB0 of a target object TA (a person) obtained by inputting the input image D (without noise) to the test target model M on the input image D obtained by imaging the target object TA, a boundary box BB1 of the target object TA obtained by inputting noise-added image ND obtained by adding noise A to the input image D to the test target model M, a boundary box BB2 of the target object TA obtained by inputting noise-added image ND obtained by adding noise B to the input image D to the test target model M, and a boundary box BB3 of the target object TA obtained by inputting noise-added image ND obtained by adding noise C to the input image D to the test target model M are shown.

The inference result acquirer 14 acquires and aggregates inference results for each image output by the inferrer 100 and inputs the aggregated inference results to the inference result group generator 15. The inference result acquirer 14 is an example of an "object detection result acquirer." The inference result acquirer 14 acquires an output result of the test target model M when at least one of the input image D or the noise-added image ND is input as the object detection result.

The inference result group generator 15 generates an inference result group (an object region candidate group) associated with each other on the basis of an inference result for each image (for each noise condition). The inference result group generator 15, for example, compares boundary boxes included in the inference results for each of the input image D and the noise-added image ND in a total search process and generates a mutually associated inference result group on the basis of an overlap degree. The inference result group generator 15, for example, calculates an overlap ratio between object detection regions (boundary boxes) on the basis of an overlap ratio (intersection over union (IoU)), compares the detection results for each noise condition, groups candidates with a maximum overlap ratio as object region candidates indicating the same object, and generates an inference result group. The inference result group generator 15, for example, uses the boundary box BB0 of the input image D, which is an image without noise, as a reference, and generates a boundary box with an overlap ratio (IoU) to the boundary box BB0 exceeding a prescribed threshold value (for example, exceeds 0.5) as a mutually associated inference result group. Alternatively, the inference result group generator 15, for example, uses the noise-added image ND with the lowest (or highest) noise level as a reference and generates a boundary box with an overlap ratio (IoU) to the boundary box BB0 exceeding a prescribed threshold value (for example, exceeds 0.5) as a mutually associated inference result group. The inference result group generator 15 is an example of an "inference result group generator."

In the example shown in FIG. 2, for example, using the boundary box BB0 (without noise) as a reference, the boundary box BB1, the boundary box BB2, and the boundary box BB3 with the overlap ratio (IoU) to the boundary box BB0 exceeding the prescribed threshold value (a total of four boundary boxes) are grouped as an inference result group.

Figure 3:
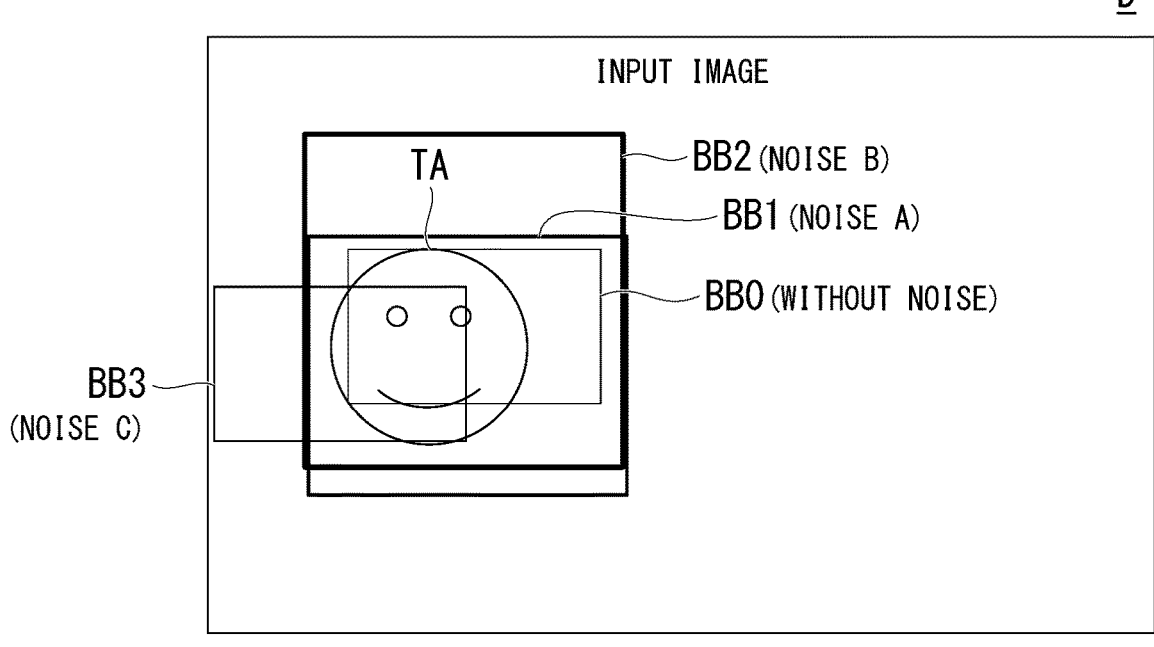
FIG. 3 is a diagram showing another example of a state in which a boundary box BB is set for an image according to the first embodiment.

FIG. 3 is a diagram showing another example of a state in which the boundary box BB is set for the image according to the first embodiment. In the example shown in FIG. 3, the overlap ratio (IoU) of the boundary box BB3 to the boundary box BB0 is less than or equal to a prescribed threshold value. In this case, the boundary box BB1 and the boundary box BB2 (a total of three boundary boxes from which the boundary box BB3 is excluded) with the overlap ratio (IoU) to the boundary box BB0 exceeding the prescribed threshold value are grouped as an inference result group.

Figure 4:
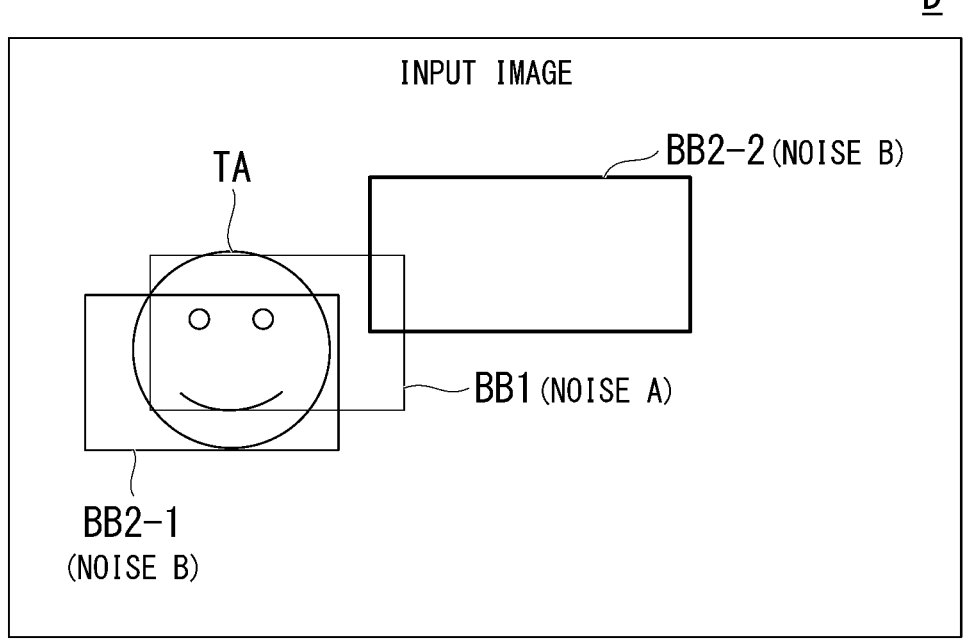
FIG. 4 is a diagram showing yet another example of a state in which a boundary box BB is set for an image according to the first embodiment.

FIG. 4 is a diagram showing yet another example of a state in which the boundary box BB is set for an image according to the embodiment. In the example shown in FIG. 4, a boundary box BB1 based on a noise-added image ND obtained by adding noise A to an input image D and boundary boxes BB2-1 and BB2-2 based on a noise-added image ND obtained by adding noise B to the input image D are shown. Because the boundary boxes BB2-1 and BB2-2 both overlap boundary box BB1 but the boundary box BB2-1 has a higher overlap ratio (IoU) (exceeding a threshold value), the boundary box BB1 and the boundary box BB2-1 are grouped as object region candidates indicating the same object and set as an inference result group here.

The robustness measurer 16 measures the robustness of the test target model M on the basis of the generated inference result group. The robustness measurer 16 performs a statistical process on the inference result group to calculate a robustness index. The object region can be indicated by coordinates indicating the center of the rectangle, the width and height of the rectangle, the coordinates, the width and height of one point indicating the corners of the rectangle, the coordinates of two points indicating the diagonal corners of the rectangle, and the like. A statistical process can be applied to all of these measurement values and a state in which an object detection region is moved, enlarged, and reduced according to addition of noise can be ascertained by calculating at least one of a variance value, a maximum value, an average value, or a median value on the basis of rectangular coordinates for the same object across a plurality of noise conditions. When the object region indicating the same object does not change, the test target model M is considered to be robust against noise. In contrast, if the change is large, it can be said to be vulnerable. In addition to robustness for each detection region, robustness for each image can also be considered. Because there are a plurality of object detection candidates within the image, the robustness of the entire image can be calculated by averaging the robustness for each detection area or by adopting a maximum value. The reason why the maximum value is adopted instead of the minimum value is that it is desirable to use the most vulnerable example as a representative in robustness determination.

Also, an object region included in the inference result group has an estimated class label. Object region candidates indicating the same object are normally assumed to have the same estimated class label, but the estimated class label may change due to noise. When the variance value of the estimated class label is small, it can be considered robust. In contrast, when the variance value is large, it can be said to be vulnerable. In order to perform a robustness determination process of the estimated class label, correct answer determination or the like based on comparison with training data (correct answer data) in normal object detection is applied only to object region candidates that have the same class label as the training data. However, in the present embodiment, the same object is determined without distinguishing the estimated class labels. The robustness of the image can be calculated by averaging the robustness for each detection region with respect to the estimated class label or by adopting the maximum value. The reason why the maximum value is adopted instead of the minimum value is that it is desirable to use the most vulnerable example as a representative in robustness determination. That is, the robustness measurer 16 calculates the variance value of the label for identifying the object included in the object detection result and calculates the robustness of the coordinates of the object and the robustness of class identification based on the label.

In the inference result group generator 15, candidates with an overlap ratio (IoU) exceeding the threshold value are grouped as object region candidates indicating the same object when the object detection results for each type of noise are compared and an inference result group is generated. However, when object regions that have not been detected under other noise conditions have an overlap ratio (IoU) less than or equal to the threshold value, no group is generated or candidates are missed under certain noise conditions. The inference result group generator 15 assigns a non-detection label when there is a noise condition in which objects with an overlap ratio (IoU) less than or equal to a certain threshold value are not considered to be the same object and there is no candidate with an overlap ratio exceeding the threshold value within the group. In the inference result group indicating the same object, it is determined whether or not there is excessive detection in accordance with a ratio of noise to which the non-detection label is added to noise added by the noise adder 12. For example, in a case where a noise value is 2, a non-noise value is 1, and a threshold value is set to 0.5, a detection rate becomes 33.3% when a non-detection value is 2 and becomes less than or equal to a threshold value. When it is less than or equal to the threshold value, the detection is regarded as pseudo excessive detection (FalsePositive' (FP'). When it exceeds the threshold value, the detection is regarded as pseudo correct detection (TruePositive' (TP'). As an excessive detection index, a pseudo precision rate, Precision', can be calculated, and is expressed by the following Eq. (1). Also, it is also possible to adopt a pseudo excessive detection rate (FalsePositive Per Image' (FPPI')) for each image as an excessive detection index.

$$\text{Precision}' = \frac{TP'}{TP' + FP'} \qquad (1)$$

The provider 17 provides the measured robustness information to a terminal device T of a request source via, for example, the communication network NW. The user U can confirm the robustness of the test target model M by viewing the robustness information displayed on the display unit of the terminal device T or the like.

The storage 20 stores, for example, the input image D, the noise-added image ND, and the like. The storage 20 is, for example, a storage device such as a hard disk drive (HDD), a random-access memory (RAM), a solid-state drive (SSD), or a flash memory. Also, the storage 20 may be implemented by another storage device such as a network-attached storage (NAS) or an external storage server device connected via a communication network NW.

[Processing Flow]

Figure 5:
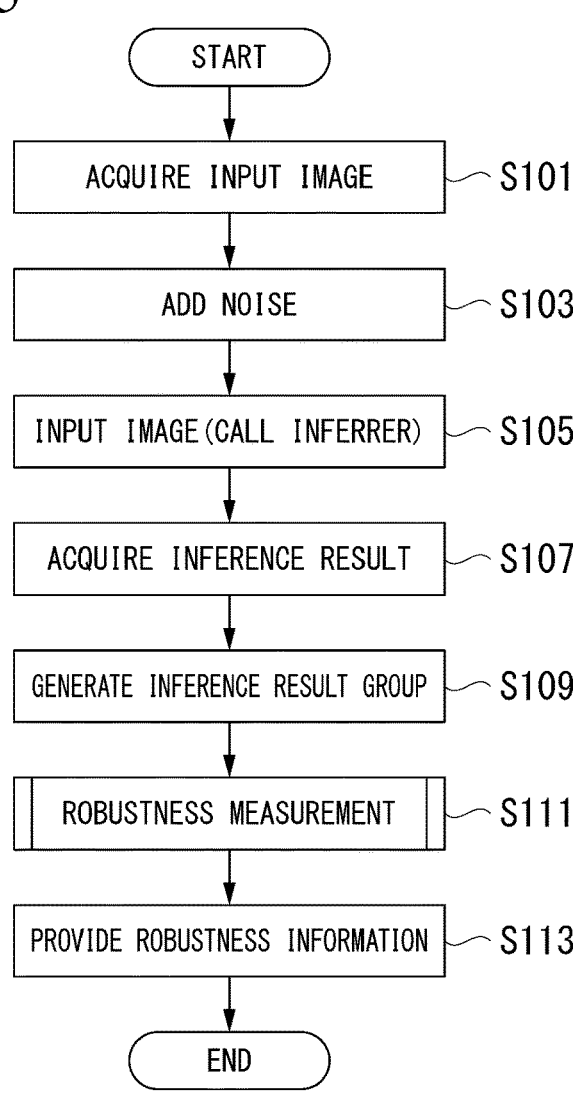
FIG. 5 is a flowchart showing an example of a robustness measurement process according to the first embodiment.

Next, a flow of a robustness measurement process of the robustness measurement device 1 will be described. FIG. 5 is a flowchart showing an example of the robustness measurement process according to the first embodiment.

First, the acquirer 11 acquires a robustness measurement request (an input image D) transmitted from the terminal device T via the network NW (step S101). In addition, the acquirer 11 may acquire the input image D from another storage device (not shown) or a device such as a camera or from the storage 20.

Next, the noise adder 12 adds noise to the input image D to generate at least one noise-added image ND (step S103). The noise adder 12 adds noise to the input image D according to reproduction of weather noise such as rain or snow or the like as well as, for example, rotation, flipping, barrel/pincushion/shear distortion, Gaussian noise, color channel swapping, grayscale conversion, histogram equalization, and the like of the input image D.

Subsequently, the image input 13 calls the inferrer 100 of the inference device ID via the communication network NW and inputs at least one of the input image D or the noise-added image ND to the test target model M via the inferrer 100 (step S105). Subsequently, the inference result acquirer 14 acquires an inference result (for example, an object detection result) for each image output by the inferrer 100 (step S107).

Subsequently, the inference result group generator 15 generates an inference result group (an object region candidate group) on the basis of the inference result for each image (for each noise condition) (step S109). The inference result group generator 15, for example, compares boundary boxes included in the inference results for each of the input image D and the noise-added image ND in a total search process and generates a mutually associated inference result group on the basis of an overlap degree.

Subsequently, the robustness measurer 16 measures the robustness of the test target model M on the basis of an inference result group (step S111). The robustness measurer 16 performs a statistical process for the inference result group to calculate a robustness index. The robustness index is broadly classified into the robustness of each boundary box included in the input image D (local robustness) and the robustness of the input image D itself (overall robustness). Also, the robustness is measured on the basis of a different method in accordance with whether the test target model M corresponds to "supervised" or "unsupervised" or corresponds to "regression" or "classification."

<Measurement of Boundary Box Robustness (Local Robustness)>

(1) Method 1 (in Case of "Supervised" and "Regression")

Figure 6A:
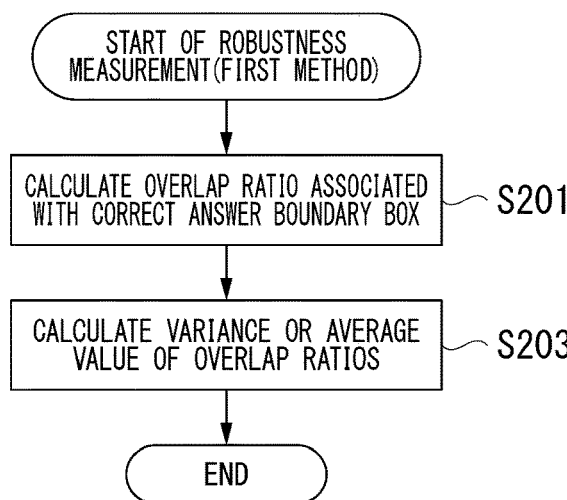
FIG. 6A is a flowchart showing an example of a first method of robustness measurement according to the first embodiment.

FIG. 6A is a flowchart showing an example of a first method of robustness measurement according to the first embodiment. First, the robustness measurer 16 calculates an overlap ratio (IoU) of a boundary box BB included in each of an input image D (without noise) and a noise-added image ND with respect to a correct answer boundary box, which is correct answer data on the basis of an inference result group (step S201). Subsequently, the robustness measurer 16 calculates a variance value or an average value of the calculated overlap ratio (IoU) and adopts the calculated variance or average value as a robustness value (step S203). With this, the process of the present flowchart is completed.

(2) Second Method (in Case of "Supervised" and "Classification")

Figure 6B:
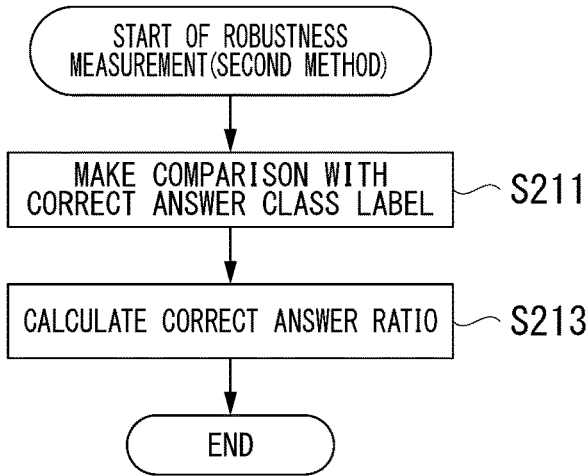
FIG. 6B is a flowchart showing an example of a second method of robustness measurement according to the first embodiment.

FIG. 6B is a flowchart showing an example of a second method of robustness measurement according to the first embodiment. First, the robustness measurer 16 compares a correct answer class label, which is correct answer data, with estimated class labels of an input image D (without noise) and a noise-added image ND on the basis of an inference result group and determines whether or not the labels match (step S211). Subsequently, the robustness measurer 16 calculates a correct answer ratio, which is a ratio of the number of estimated class labels that match the correct answer class label to the number of estimated class labels (equivalent to the number of images), and adopts the calculated correct answer ratio as the robustness value (step S213). With this, the process of the present flowchart is completed. The robustness measurer 16 may directly evaluate each estimated class label (a non-detection class label in the case of non-detection), calculate neighbor accuracy, and adopt the calculated neighbor accuracy as the robustness value.

(3) Third Method (in Case of "Unsupervised" and "Regression")

Figure 6C:
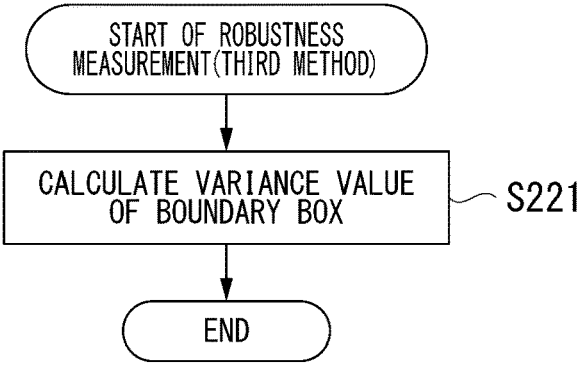
FIG. 6C is a flowchart showing an example of a third method of robustness measurement according to the first embodiment.

FIG. 6C is a flowchart showing an example of a third method of robustness measurement according to the first embodiment. First, the robustness measurer 16 calculates a variance value on the basis of rectangular coordinates of boundary boxes BB included in the same inference result group and adopts the calculated variance value as a robustness value (step S221). With this, the process of the present flowchart is completed.

(4) Fourth Method (in Case of "Unsupervised" and "Classification")

Figure 6D:
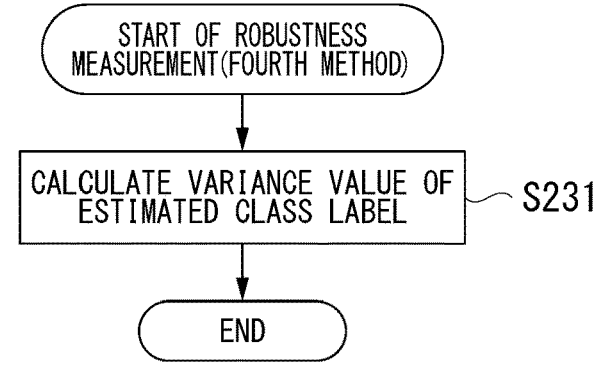
FIG. 6D is a flowchart showing an example of a fourth method of robustness measurement according to the first embodiment.

FIG. 6D is a flowchart showing an example of a fourth method of robustness measurement according to the first embodiment. First, the robustness measurer 16 calculates a variance value of class labels of boundary boxes BB included in the same inference result group and adopts the calculated variance value as the robustness value (step S231). With this, the process of the present flowchart is completed.

<Measurement of Robustness of Entire Image (Overall Robustness)>

Methods according to the above-described first to fourth methods are applicable to the measurement of the robustness of the entire image (global robustness) like the above-described measurement of the robustness of the boundary box (local robustness). For example, as in the first to fourth methods above, the overall robustness is measured by calculating a variance or average (robustness) value for each inference result group and taking an average or maximum value of a plurality of obtained robustness values.

Returning to FIG. 5, next, the provider 17 provides measured robustness information to the terminal device T of the request source via, for example, the communication network NW (step S113). The user U can confirm the robustness of the test target model M by viewing the robustness information displayed on the display unit of the terminal device T or the like. With this, the process of the present flowchart ends.

According to the robustness measurement device 1 of the first embodiment described above, it is possible to easily and highly accurately measure the robustness of a machine learning model regardless of the presence or absence of a training data. Also, the robustness of any machine learning model can be tested under any noise conditions by the noise adder 12. Also, even if the inference result group generator 15 does not have correct answer data (unsupervised), the robustness measurer 16 can measure a robustness index from statistical information of the inference result included in the inference result group. A robustness index can also be measured in relation to one of regression and classification inference processes.

Second Embodiment

A second embodiment will be described below. A robustness measurement device of the second embodiment is different from that of the first embodiment in that a robustness index is calculated in consideration of the importance of each noise condition. The robustness measurement device of the second embodiment will be described below, focusing on the difference from the first embodiment.

Figure 7:
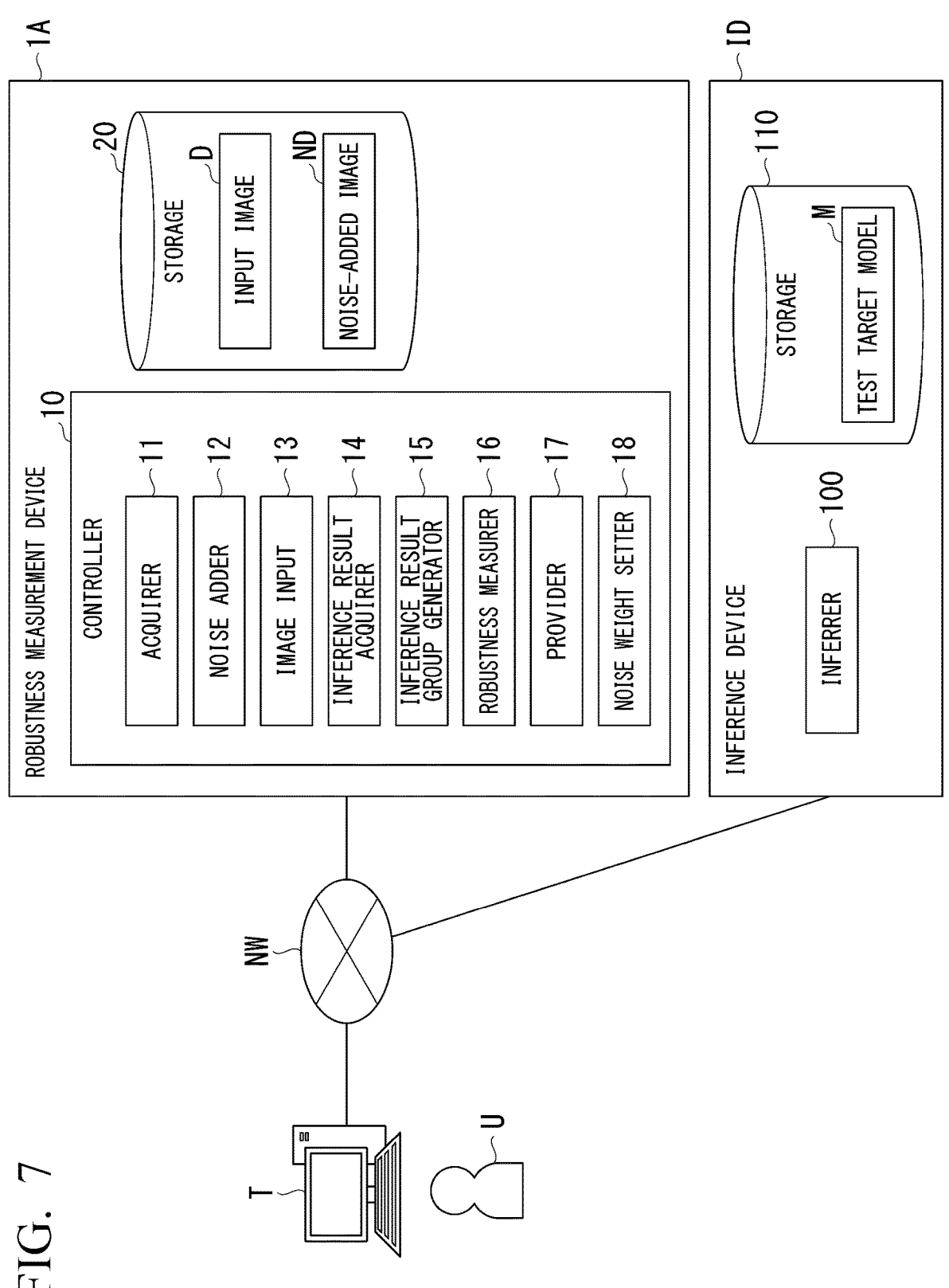
FIG. 7 is a functional block diagram showing an example of a functional configuration of a robustness measurement device 1A according to a second embodiment.

FIG. 7 is a functional block diagram showing an example of a functional configuration of a robustness measurement device 1A according to the second embodiment. A controller 10A of the robustness measurement device 1A includes, for example, a noise weight setter 18 in addition to an acquirer 11, a noise adder 12, an image input 13, an inference result acquirer 14, an inference result group generator 15, a robustness measurer 16, and a provider 17.

Figure 8:
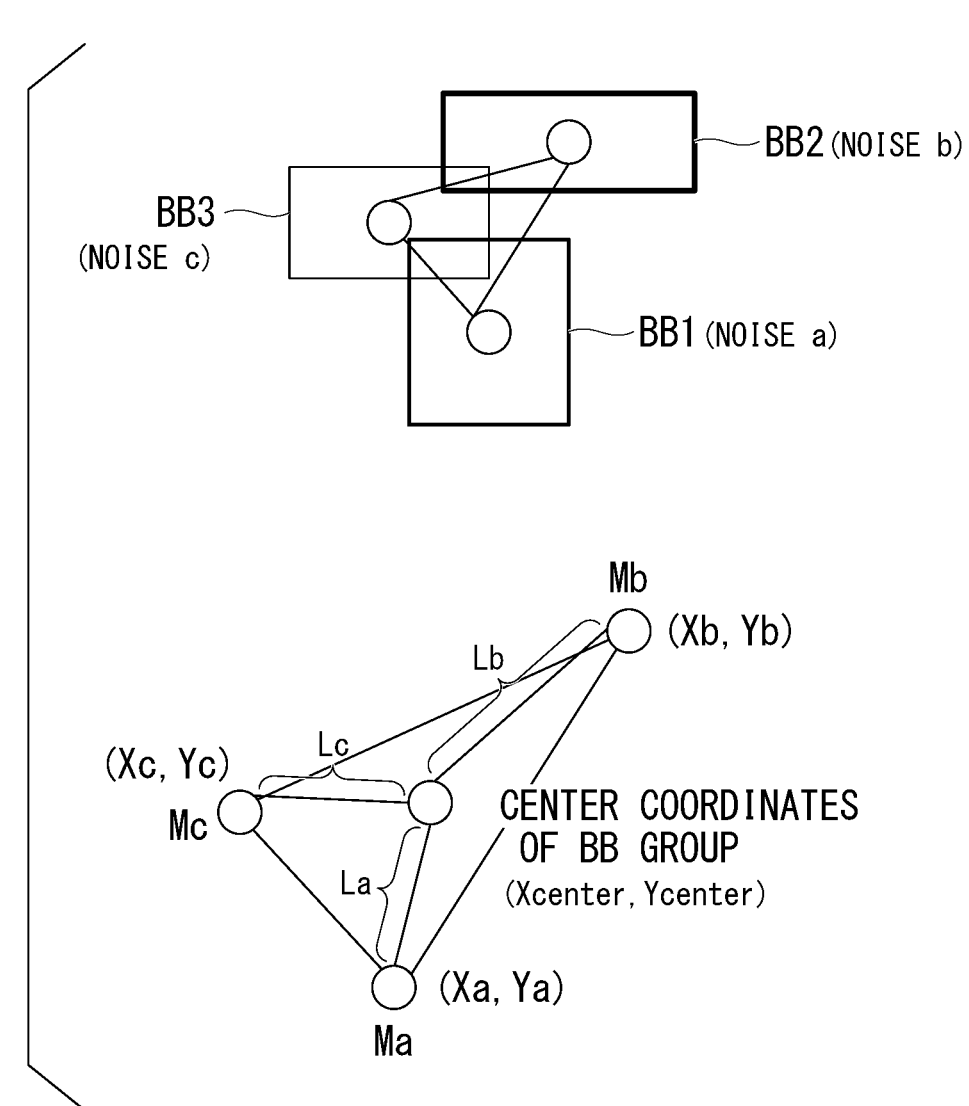
FIG. 8 is a diagram for describing a weight setting process for each noise condition according to the second embodiment.

The noise weight setter 18 sets a weight (a noise weight) for each noise condition in consideration of the importance of each noise condition added by the noise adder 12. The noise weight is defined by, for example, a user U of a terminal device T, an administrator of the robustness measurement device, or the like. FIG. 8 is a diagram for describing a weight setting process for each noise condition according to the second embodiment. As shown in FIG. 8, when three boundary boxes BB1 to BB3 are generated using three types of noise (noise a, noise b, and noise c), the center coordinates of the object detection candidate group as shown in the following Eq. (2) are obtained. In Eq. (2), $(X_a, Y_a)$, $(X_b, Y_b)$, and $(X_c, Y_c)$ are representative points of a boundary box BB1, a boundary box BB2, and a boundary box BB3 (a center coordinate, an upper left coordinate, a lower left coordinate, an upper right coordinate, a lower right coordinate, a midpoint of each side, and the like) and $(X_{center}, Y_{center})$ are the center coordinates.

$$(X_{center}, Y_{center}) = \left( \frac{X_a + X_b + X_c}{3}, \frac{Y_a + Y_b + Y_c}{3} \right) \quad (2)$$

As an example of the noise weight, if the noise weight for noise a is Ma=0.5, the noise weight for noise b is Mb=0.3, and the noise weight for noise c is Mc=0.2, noise A is prioritized. When distances to representative points (for example, center coordinates) of the boundary boxes BB1, BB2, and BB3 using the center coordinates $(X_{center}, Y_{center})$ as a reference are denoted by La, Lb, and Lc, respectively, weighted distances are denoted by MaLa, MbLb, and McLc. The robustness measurer 16, for example, measures the robustness of the test target model M by calculating a variance or average value of the weighted distances MaLa, MbLb, and McLc. By statistically processing the weighted distances in this way, a robustness index corresponding to the set noise weight is calculated. For example, in the case of in-vehicle image processing, an application example in which noise obtained by simulating the night in consideration of a high accident rate at night is prioritized, priority of noise obtained by simulating rain and snow having a relatively low probability of encounter is lowered, or the like is conceivable.

Although the case where the number of types of noise is 3 has been described above as an example, the present embodiment is not limited thereto. When the number of types of noise is n, it is possible to measure robustness of the test target model M by dividing each of a sum of x-coordinates and a sum of y-coordinates of the representative points of boundary boxes corresponding to noise by n to calculate the center coordinates and calculating a weighted distance as described above.

According to the robustness measurement device 1A of the second embodiment described above, it is possible to easily and highly accurately measure the robustness of a machine learning model regardless of the presence or absence of a training data. Also, the robustness of any machine learning model can be tested under any noise condition by the noise adder 12. Also, even if the inference result group generator 15 does not have correct answer data (unsupervised), the robustness measurer 16 can measure a robustness index from statistical information of inference results included in an inference result group. Also, a robustness index can also be measured in relation to both regression and classification inference processes. Also, the noise weight setter 18 enables robustness measurement in which a desired noise condition has priority.

Third Embodiment

A third embodiment will be described below. A robustness measurement device of the third embodiment is different from that of the first embodiment in that it is possible to determine excessive detection and non-detection by generating an object region candidate group on the basis of correct answer data of object detection results. The robustness measurement device of the third embodiment will be described below, focusing on the difference from the first embodiment.

The acquirer 11 acquires correct answer data (a correct answer value) of an object detection result (a boundary box BB) corresponding to an input image D. The acquirer 11 acquires correct answer data from, for example, the terminal device T, the storage 20, another storage device (not shown), or the like. The inference result group generator 15 generates an object region candidate group on the basis of the object detection result and the correct answer value for each of the input image D and a noise-added image ND. After the object region candidate group is generated, the inference result group generator 15 calculates an overlap ratio (IoU) of each boundary box BB included in the object region candidate group for the correct answer data (the object region) serving as a training data. The object region candidate group is considered to correspond to the training data when the overlap ratio (IoU) exceeds a prescribed threshold value (for example, 0.5) and it can be said that there is no corresponding training data when the overlap ratio (IoU) is less than or equal to the prescribed threshold value. When there is no corresponding training data, excessive detection is considered.

The robustness measurer 16 calculates the robustness of a regression index of a test target model M on the basis of the overlap ratio (IoU) for the correct answer data serving as a training data. By calculating a variance or average value of the overlap ratio (IoU) for the correct answer data serving as a training data, it is possible to know whether an estimated object detection region is stable. The robustness measurer 16 calculates the robustness of a classification index on the basis of a correct answer ratio by performing the comparison with a correct answer class label serving as a training data. For the robustness of the entire image (overall robustness), it is possible to calculate the robustness of the image by averaging the robustness for each detection region or by adopting a maximum value in relation to the regression index. Likewise, the average or maximum value can be adopted as the classification index and a robustness index for the entire image can be calculated.

Excessive detection and non-detection are determined in accordance with a ratio of noise to which a non-detection label is assigned to noise added by the noise adder 12 in the object detection candidate group indicating the same object. FIG. 9 is a diagram showing an example of (supervised) determination results of excessive detection and non-detection according to the third embodiment. In FIG. 9, an example in which a total of three images, i.e., two noise-added images (noise A and noise B) and one non-noise image (non-noise), are used and a threshold value for detection determination is set to 0.5 is shown. In case 1, in the three images of the object detection candidate group indicating the same object, a case where the overlap ratio (IoU) associated with the correct answer data exceeds the threshold value and the estimated class label matches the correct answer data with respect to noise A and non-noise (O: correct answer) but the overlap ratio (IoU) associated with the correct answer data is less than or equal to the threshold value and the estimated class label does not match the correct answer data with respect to noise B (X: incorrect answer) is shown. In this case, the detection rate is two-thirds (0.66), which exceeds the threshold value. Case 1 is determined to be "correct detection (TruePositive (TP))." On the other hand, in case 2, in the three images of the object detection candidate group indicating the same object, a case where the overlap ratio (IoU) associated with the correct answer data exceeds the threshold value and the estimated class label matches the correct answer data with respect to non-noise (O: correct answer) but the overlap ratio (IoU) associated with the correct answer data is less than or equal to the threshold value and the estimated class label does not match the correct answer data with respect to noise A and noise B (X: incorrect answer) is shown. In this case, the detection rate becomes one-third (0.33) less than or equal to the threshold value. Case 2 is determined to be "non-detection (FalseNegative (FN))." That is, a case where the detection rate is less than or equal to the threshold value and there is a training data is determined to be non-detection (FN) and a case where the detection rate is greater than the threshold value and there is a training data is determined to be correct detection (TP).

On the other hand, cases 3 and 4 are cases where there is no overlap with the correct answer data (the overlap ratio (IoU) is zero) (i.e., cases that are not associated with the correct answer data) in the three images of the object detection candidate group indicating the same object. Here, estimated class labels are assigned to noise A and non-noise for case 3 and an estimated class label is assigned to noise A for case 4, but these estimated class labels may be likely to be erroneous. Thus, cases 3 and 4 are determined to be "excessive detection (FalsePositive (FP))." In other words, in a case that is not associated with correct answer data, when an estimated class label is assigned, it is treated as excessive detection (FP) regardless of the detection rate. As described above, detection performance indices such as Precision, Recall, and an F-value can be calculated from correct detection (TP), non-detection (FN), and excessive detection (FP). Also, an excessive detection rate (FalsePositive Per Image (FPPI)) for each image can be similarly calculated.

Even if correct answer data does not exist (unsupervised), it is possible to determine correct detection or excessive detection as follows. FIG. 10 is a diagram showing an example of determination results (unsupervised) of correct detection and excessive detection according to the third embodiment. In FIG. 10, an example in which a total of three images, i.e., two noise-added images (noise A and noise B) and one non-noise image (non-noise), are used and the threshold value for detection determination is set to 0.5 is shown. In case 5, noise A and non-noise are set in an object detection candidate group indicating the same object and their estimated class labels match, but noise B is not included in object detection candidate groups of noise A and non-noise. In this case, the detection rate is two-thirds (0.66), which exceeds the threshold value. Case 5 is determined to be "pseudo correct detection (TP')." The reason why it is set as "pseudo" is that there is no correct answer data in the unsupervised case and therefore there is no confirmation of the correct answer. On the other hand, in case 6, non-noise is assigned an estimated class label, while noise A and noise B are assigned a non-detection label. In this case, the detection rate becomes one-third (0.33) less than or equal to the threshold value. Case 6 is determined to be "pseudo excessive detection (FP')."

That is, the robustness measurer 16 calculates the detection rate in the object region candidate group on the basis of the non-detection label assigned to the object detection result that does not overlap other object detection results in the object region candidate group indicating the same object and calculates an excessive detection index on the basis of the calculated detection rate.

According to the robustness measurement device 1 of the third embodiment described above, it is possible to easily and highly accurately measure the robustness of a machine learning model regardless of the presence or absence of a training data. Also, the robustness of any machine learning model can be tested under any noise condition by the noise adder 12. Also, even if the inference result group generator 15 does not have correct answer data (unsupervised), the robustness measurer 16 can measure the robustness index from the statistical information of the inference results included in the inference result group. Also, a robustness index can also be measured for both regression and classification inference processes.

Also, it is possible to obtain an index of excessive detection, which is important in object detection. Apart from the robustness of the detection result, by suggesting that the detection itself is likely to be excessive detection, a countermeasure of adjusting a detection threshold value of object detection or excluding results having excessive detection properties of a certain level or higher from a learning process or the like is performed when a re-learning process is performed on the basis of data with low robustness. Also, more accurate robustness measurement can be performed by utilizing training data (correct answer data).

Usage Example

As the application of the robustness index measured as described above, it can be used as a degree of reliability. A method of outputting the reliability of the results by combining a deep neural network (DNN) with a Bayesian inference or the like is often used. Because high robustness is considered to be high reliability, it is possible to apply robustness measurement to machine learning models that do not have a reliability output as a substitute for reliability. Also, even if the method has a reliability output, it is possible to determine a degree to which the reliability output based on the Bayesian inference is correlated with practical noise resistance and make a comparison with the measurement result of robustness and it is possible to measure a degree to which the reliability output is reliable.

As an example of utilization as reliability, a case where it is possible to determine that an inference result is unreliable if one item of vulnerable data is found is conceivable. For example, when a camera image is unreliable in an in-vehicle monitoring system such as an automated driving assistance system, it is possible to take a countermeasure such as prioritizing a detection result of another sensor such as a LiDAR sensor. In this way, robustness measurement can be effective in applications where data is updated from time to time and reliability needs to be measured from time to time. This also applies to the use of AI, such as tracking wanted criminals with surveillance cameras or detecting whether trouble has occurred. This also applies to systems that use cameras mounted on trains to image and detect suspicious objects entering the tracks and the like.

On the other hand, the reliability can be similarly utilized when a specific scene is regarded as important when the data is analyzed later without having real-time property. For example, this applies to a case where attention is focused only on a few frames at the moment of an accident, such as an accident video recorded by a drive recorder, and the result of object detection on the image is emphasized and the like. Depending on the circumstances, an analysis process may also be performed later with surveillance cameras and an on-site inspection may be performed later when a crime scene has been imaged. Also, in sports video recording, it is necessary to pay attention to specific scenes such as a scene in which a goal was scored or a scene in which a foul was committed and it is considered to be effective when looking back on the team's play. In the case of sports, a system that assists referees in real time is also conceivable.

Robustness measurement can be used not only for reliability but also for re-learning. By collecting data determined to be vulnerable as a result of robustness measurement and re-training the object detection model serving as a test target, it is possible to build a more robust model against vulnerable data. Instead of using the data determined to be vulnerable as it is, it is also possible to focus on the vulnerability of the class label and consider additional learning of the class to which the vulnerable data belongs. For example, if the tested object detection model is determined to be vulnerable to motorcycles, a case in which scenes where motorcycles are imaged are collected and re-learning is performed can be considered. If it is difficult to acquire new learning data, it is also possible to perform a countermeasure for adjusting the division of learning data and making an adjustment so that more images of motorcycles are included in the learning data.

There are two types of robustness indices: robustness for each detected object region (boundary box) and robustness for each image. When the robustness index is utilized as reliability, it is only necessary to measure the robustness for each boundary box. On the other hand, from the viewpoint of re-learning, because re-learning is performed using vulnerable images, robustness for each image can be adopted. However, in the case of re-learning and addition of categories, information is collected for each boundary box and vulnerable labels are identified and used.

Also, object detection is considered to be a combination of two kinds of tasks, i.e., regression of detection coordinates and classification of detection classes, but the robustness index can be calculated independently in two types of the regression index and the classification index. In an example in which a vehicle position and a distance are estimated with a combination of a detected vehicle and three-dimensional measurement technology and the use for automated driving is implemented, a regression index is adopted because the position of obstacles to be avoided is emphasized. On the other hand, in a case where a wanted criminal is found with a surveillance camera and the like, the classification label of the detection result is considered to be important and it can be said that the index to be adopted changes depending on the application. When both regression and classification are emphasized, it is possible to linearly combine two types of indices, i.e., a regression index and a classification index, to integrate them into one robustness index.

Excessive detection indices such as pseudo-precision in the unsupervised example and an F-value in the supervised example are considered as a type of robustness for each image. A countermeasure for monitoring an average of excessive detection indices of the entire dataset and adjusting an object detection threshold value of an object detection model when the average exceeds a threshold value or the like is possible. Also, in order to classify absolute robustness and vulnerability into binary categories for these indices, it is necessary to determine a threshold value for the robustness index and to perform an operation of determining a threshold value in a test target domain using a plurality of datasets for determining the threshold value. On the other hand, it is easy to compare robustness indices within the test target dataset and detect relatively vulnerable data points, for example, it is possible to extract and re-learn data of the bottom 10% of the robustness index.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A robustness measurement device comprising:
an acquirer configured to acquire an input image;
a noise adder configured to add noise to the input image to generate at least one noise-added image;

an image input configured to input each of the input image and the at least one noise-added image to a test target model for object detection;

an object detection result acquirer configured to acquire a plurality of object detection results which are inference results output from the test target model when each of the input image and the at least one noise-added image have been input;

an inference result group generator configured to generate an inference result group, which is an object region candidate group, by grouping mutually associated object detection results among the plurality of object detection results based on an overlap ratio between the plurality of object detection results; and a robustness measurer configured to measure robustness of the test target model on the basis of the inference result group.

2. The robustness measurement device according to claim 1, wherein the robustness measurer is configured to measure robustness of the test target model by performing a statistical process with respect to the object detection result included in the object region candidate group.

3. The robustness measurement device according to claim 1, wherein the robustness measurer is configured to compare object detection results for the input image and the noise-added image and group the object detection results having a maximum overlap ratio as the object region candidate group indicating the same object.

4. The robustness measurement device according to claim 2, wherein the robustness measurer is configured to calculate at least one of a variance value, a maximum value, an average value, or a median value of coordinates of an object indicated by each of the object detection results included in the object region candidate group as the statistical process.

5. The robustness measurement device according to claim 4, wherein the robustness measurer is configured to calculate a variance value of a label for identifying the object included in the object detection results and calculate robustness of the coordinates of the object and robustness of class identification based on the label.

6. The robustness measurement device according to claim 1, wherein the robustness measurer is configured to calculate a detection rate within the object region candidate group on the basis of a non-detection label assigned to an object detection result that does not overlap another object detection result in the object region candidate group indicating the same object and calculate an excessive detection index on the basis of the calculated detection rate.

7. The robustness measurement device according to claim 1, further comprising a noise weight setter configured to set a noise weight indicating importance of each noise condition, wherein the robustness measurer is configured to measure the robustness on the basis of the set noise weight.

8. The robustness measurement device according to claim 1, wherein the acquirer is further configured to acquire a correct answer value of the object detection result, and wherein the inference result group generator is configured to generate the object region candidate group on the basis of the object detection result and the correct answer value for each of the input image and the noise-added image.

9. A robustness measurement method comprising:

acquiring, by a computer, an input image;

adding, by the computer, noise to the input image to generate at least one noise-added image;

inputting, by the computer, each of the input image and the at least one noise-added image to a test target model for object detection;

acquiring, by the computer, a plurality of object detection results which are inference results output from the test target model when each of the input image and the at least one noise-added image have been input;

generating, by the computer, an inference result group, which is an object region candidate group, by grouping mutually associated object detection results among the plurality of object detection results based on an overlap ratio between the plurality of object detection results; and measuring, by the computer, robustness of the test target model on the basis of the inference result group.

10. A computer-readable non-transitory storage medium storing a program for causing a computer to:

acquire an input image;

add noise to the input image to generate at least one noise-added image;

input each of the input image and the at least one noise-added image to a test target model for object detection;

acquire a plurality of object detection results which are inference results output from the test target model when each of the input image and the at least one noise-added image have been input;

generate an inference result group, which is an object region candidate group, by grouping mutually associated object detection results among the plurality of object detection results based on an overlap ratio between the plurality of object detection results; and measure robustness of the test target model on the basis of the inference result group.

* * * * *